Aug. 7, 1934.  E. L. BAKER  1,969,250
FUEL REGULATOR
Filed Feb. 24, 1932  2 Sheets-Sheet 1
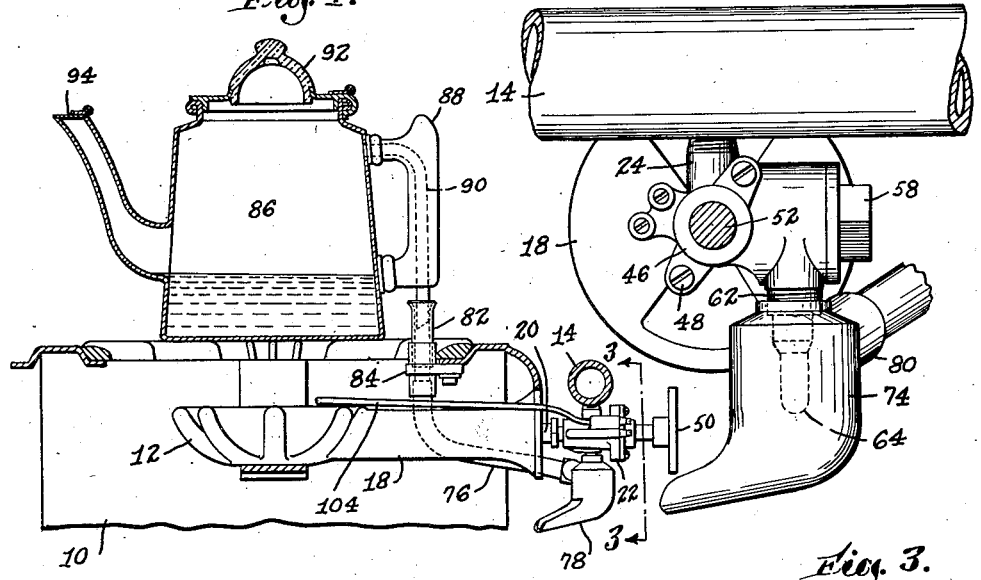
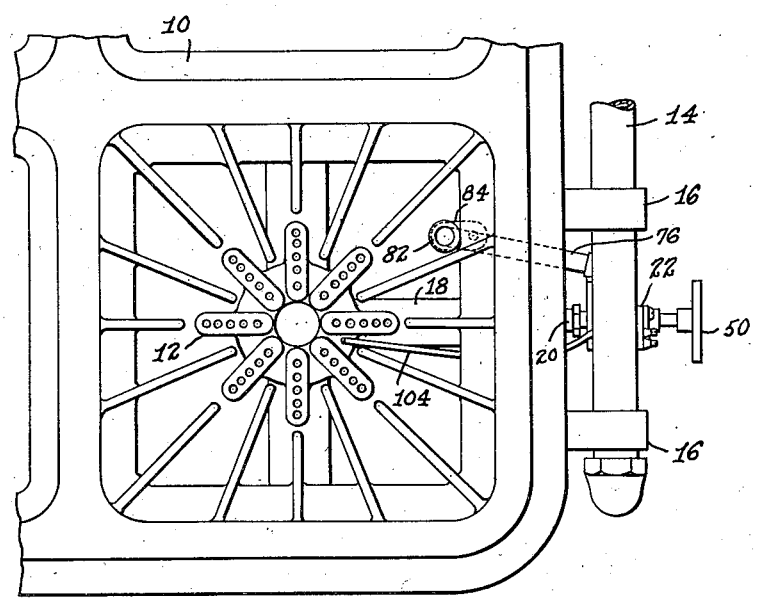
Inventor
E. L. Baker
by Kenway + Witter
Attorneys Aug. 7, 1934.  E. L. BAKER  1,969,250
FUEL REGULATOR
Filed Feb. 24, 1932  2 Sheets-Sheet 2

Inventor
E. L. BAKER
by Kenway + Witter
Attorneys

Patented Aug. 7, 1934

1,969,250

UNITED STATES PATENT OFFICE 1,969,250

FUEL REGULATOR

Eugene L. Baker, Taunton, Mass.

Application February 24, 1932, Serial No. 594,784

9 Claims. (Cl. 236—20)

This invention relates to the art of automatic heat control of a burner in accordance with the heat of vapor given off from a vessel being heated by the burner. I am aware that devices of this nature and for this purpose have been heretofore suggested and devised but such devices have been rather inefficient and have operated in such an irregular and fluctuating manner that they have not been entirely satisfactory for the purpose intended. The primary object of my invention is to produce a new and improved device of this nature which will function with such regularity and accuracy as efficiently to control the burner and provide a satisfactory regulator for the purpose stated.

While my invention as herein described is especially applicable to the use of gaseous fuels, it will be understood that in its broader sense it is not to be considered as thus limited since it is well adapted to use with other fuels, such as electricity, for example. In order properly and efficiently to control the fuel supply to the burner, the automatic controlling element must be so located as to be unaffected by the burner heat and must be sufficiently responsive to the vapor heat conducted thereto readily to modify the fuel supply but not so responsive as to cause fluctuations or pulsations in the fuel supply. The device should also be relatively simple in construction and operation and relatively inexpensive to produce. Having these requirements in mind, I have devised an improved regulator embodying a relatively simple bi-metallic thermostatic unit conveniently located and combined in the device in such manner that it will automatically function to provide a uniform and steady flow of fuel to the burner in accordance with the vapor heat produced by the burner and conducted to the unit. The production of such an improved regulator comprises a further object of my invention.

As above stated, my invention is especially applicable to the controlling of gaseous fuel and as thus embodied the thermostatic element is preferably so housed within the body of the controlling member as to prevent the escape of gas therefrom and at the same time permit the action of the vapor heat on the element to cause its automatic fuel controlling operation. The device is furthermore preferably constructed in a body member which can be conveniently substituted for the ordinary gas cocks on ranges and the like. As thus constructed, the device preferably comprises a unitary member conveniently and compactly embodying the automatic controlling element and its valve, a manually operable shut-off valve, and one or more bypasses through the member for preventing the complete extinguishing of the burner flame when the automatic valve is closed. The production of an improved gas controlling device embodying these and other features hereinafter described comprises another object of the invention.

In the accompanying drawings I have shown one specific embodiment of my invention but it will be understood that the invention can be otherwise embodied and that the drawings are not to be construed as defining or limiting the scope of the invention, the claims appended hereto being relied upon for that purpose.

Referring to the figures of the drawings,

Fig. 1 is an elevation, partly in vertical section, of a gas range embodying my invention;

Fig. 2 is a plan view of the range;

Fig. 3 is an enlarged view taken on line 3—3 of Fig. 1 and showing the improved gas cock member in front elevation;

Figure 4:
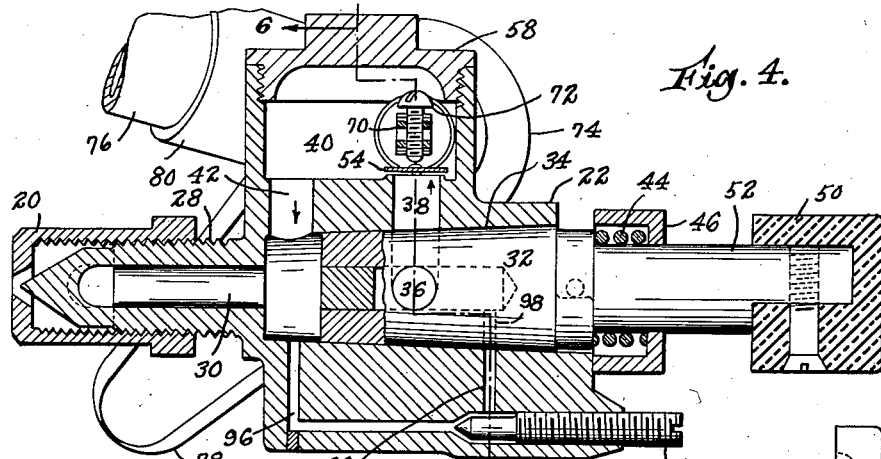
Fig. 4 is an enlarged plan sectional view thereof taken on line 4—4 of Fig. 5.
Figures 5, 7:
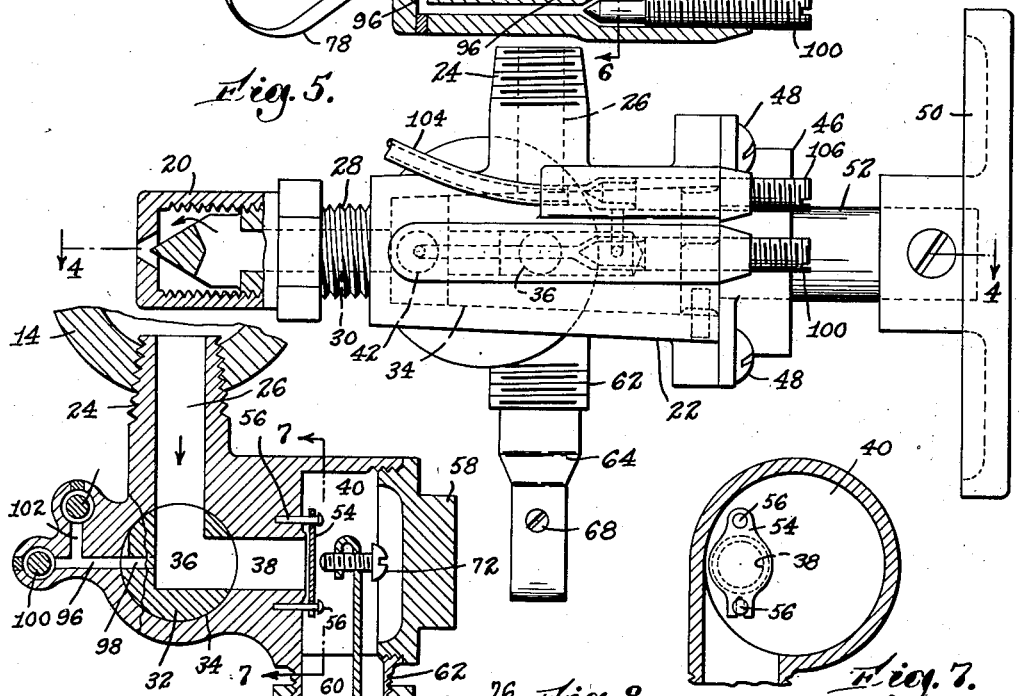
Fig. 5 is a side elevation of the member.
Fig. 7 is a fragmentary sectional view taken on line 7—7 of Fig. 6.

The specific construction, embodying a gas range 10, which I have illustrated in the drawings for the purpose of clearly disclosing my invention, will now be described. The range 10 has the usual burner 12 and a gas supplying pipe 14 supported by the brackets 16. Gas is supplied to the burner through a manifold 18, into the outer end of which extends the exit nozzle 20 of the gas controlling member 22, the gas entering the member 22 through the projection 24 which is threaded into the pipe 14. As has been heretofore stated, one of the objects of my invention is to provide a gas controlling member of the type above defined which can be readily and conveniently substituted for the ordinary gas cocks found on household ranges. This member 22, illustrated in the drawings, is thus constructed and is adapted to serve not only as a manual gas control but also as an automatic control, all as hereinafter described, the manual and automatic controls preferably being independently operable, as illustrated. I shall now proceed to describe the details of this member.

The member 22 has a projection 24 providing a gas entrance port 26 and a threaded projection 28 providing a gas exit port 30. Passage of gas through the member via the ports can be manually controlled by a rotary valve 32 within a bore 34 of the member. When the valve is open (Fig. 6) the gas passes through the port 26, right angular port 36 of the valve, port 38, into chamber 40, and from thence through ports 42 and 30 (Fig. 4). The valve is held tightly in place by a spring 44 backed up by a bushing 46 secured to the body member by screws 48. The valve may be manually rotated by a knob 50 on the stem 52, a quarter rotation of the knob to the left serving to close the valve.

The chamber 40 is adapted to house the means for controlling automatically the flow of gas through the member 22. As illustrated, a flap valve 54 is loosely supported on pins 56 over the port 38, the valve being closed by pressing it inwardly. Two openings are provided into the chamber 40 and one such opening may be closed by a threaded plug 58. The other opening 60 extends downwardly within an exteriorly threaded projection 62. The means for automatically controlling the valve 54 is housed within an extension of the chamber 40 and comprising a relatively thin sheet metal and cup-shaped member 64. This member closes the port 60 to prevent escape of gas and also supports the thermostatic means now to be described.

The thermostatic means for closing the valve 54 comprises a U-shaped bi-metallic plate-like element 66 secured as by a screw 68 to the inner wall of the member 64 and adjacent to its bottom and closed end. Secured to and extending upwardly from one end of the element 66 is a plate 70 carrying a screw 72 adjustable toward and from the valve. The open end of the member 64 fits snugly into the opening 60 and in such position the screw 72 is disposed centrally of the valve 54. The walls of the member 64 are relatively thin and so heat conductive that heat vapor directed thereagainst is readily transmitted to the element 66, which thereupon bends inwardly and causes the closing of the valve.

A member 74 threaded to the projection 62 provides a housing around the member 64, provides a support for a vapor conduit 76 and provides a drain 78. The conduit extends into a tubular projection 80 which is so arranged as to direct the vapors directly against the bottom portion of the member 64. As shown in Figs. 1 and 2, the members 74 and 64 are located at a point remote from and below the burner, whereby the burner heat does not affect the thermostat, and the conduit 76 extends inwardly and upwardly to a tubular member 82 supported by a clamp 84 adjacent to the burner.

The cooking vessel 86 illustrated comprises a closed coffee pot or percolator having a handle 88. A tube 90 extending through the handle has its upper end in communication with the interior of the vessel and its lower end projects downwardly beyond the handle. The tubular member 82 is so located that when the vessel is in position on the burner the projecting end of the tube 90 may extend downwardly thereinto. The weight of the lid 92 and cover 94 is ordinarily sufficient to prevent the escape of steam under normal pressures and sufficient to cause generated steam to pass downwardly through the tube 90 and conduit 76 and discharge against the member 64. The vapor heat is thereby transmitted to the thermostatic plate 66, which thereupon functions to close the valve 54. The thermostatic element is sufficiently sensitive to prevent violent boiling of the liquid in the vessel and is sufficiently slow in action to prevent any fluctuating or pulsating of the fuel flow, as will be understood.

It is desirable that the burner shall continue to be lighted so long as the hand valve 32 is open and, to assure this function, I provide a bypass around the valve 54. This bypass comprises a port 96 through the body member 22 and a cooperating port 98 through the valve 32. The flow of gas through these ports may be adjustably controlled by a screw 100, and it will be understood that just sufficient gas is allowed to pass to keep the burner lighted under normal conditions. It sometimes happens that a sudden draft of air striking the burner will cause this low flame to be extinguished and I preferably provide a second bypass and pilot light for relighting the burner under these circumstances. This second bypass includes a port 102 in communication with the port 96 and a tubular conduit 104 for conducting the gas to the burner and providing the pilot light. This gas may be controlled by a screw 106.

Figures 6, 8, 9:
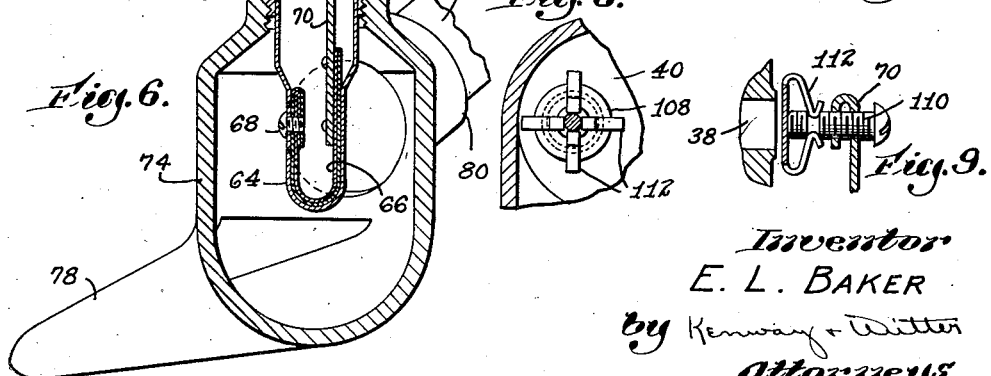
Fig. 6 is an enlarged vertical sectional view taken on line 6—6 of Fig. 4.
Figs. 8 and 9 are detail views showing a modified form of valve.

In Figs. 8 and 9 I have illustrated a modified form of an automatic valve 108 corresponding to the valve 54. The valve 54 will ordinarily be moved outwardly on its pins 56 by the gas pressure thereagainst but should any sticky deposit form on the valve seat the valve might not operate with perfect freedom. It may, therefore, be desirable to form the valve as shown in Figs. 8 and 9, wherein the valve 108 is directly connected to the screw 110 by resilient arms 112 engaging within an annular groove in the screw. As thus constructed, the valve will be moved in both directions by the screw.

It is believed that the construction, operation and advantages of my invention will now be clearly understood. Any gas range can be readily and easily equipped with one or more of the devices illustrated merely by removing the standard gas cocks thereof and substituting the member 22. The cooking vessel, which comprises no part of the present invention, will ordinarily be provided with a downwardly extending tube 90 adapted to fit into the member 82. With the hand valve 32 open (Fig. 6), a full portion of gas will continue to flow to the burner until sufficient steam is generated in the vessel to pass through the conduits 90 and 76 and against the member 64 to heat the thermostatic element 66 and cause closing movement of the valve 54. This movement of the element is such as to provide a substantially uniform flow of gas to the burner and prevent too rapid boiling of the liquid in the vessel. Should the valve 54 be entirely closed, the bypass 96 will provide sufficient gas to keep the burner lighted, and should the burner become completely extinguished, the pilot light provided by tube 104 will relight the same. Closing of the hand valve 32 completely cuts off all supply of gas to the burner and pilot light.

It should be particularly noted that the entire device is contained within the member 22, which can be bodily substituted for the ordinary gas cocks found on household ranges. The device is, furthermore, relatively compact and so constructed that it may be readily disassembled for repair or adjustment. The member 64 is substantially housed within the member 74 and the member 64 supports and houses the thermostatic element 66 and at the same time prevents escape of gas from the member 22.

Having thus described my invention, what I claim as new and desire to secure by Letters Patent is:

1. In a device for automatically controlling the passage of fuel to a burner in accordance with the temperature of vapor produced within a portable vessel heated by the burner, a fuel controlling member remote from the burner, means including a bi-metallic thermostatic element cooperating with the member in a manner cutting off the fuel flow when the element becomes heated, and means for conducting vapor to the element and including a conduit extending to a point adjacent to the burner and having an open passage thereinto at such point adapted when the vessel is placed over the burner freely to receive thereinto a vapor conducting tube carried by said vessel.

2. In a device for automatically controlling the flow of fuel gas to a burner in accordance with the temperature of vapor produced within a vessel heated by the burner, a body member having gas inlet and outlet ports and a valve chamber, a valve in said chamber intercepting said ports, a sheet metal cup-like member carried by the body member and having its open end in communication with said chamber, means including a bi-metallic thermostatic element having a curved portion seated within and contacting with the inner wall of the cupped member, said means extending into the chamber and cooperating with the valve in a manner closing the valve when the element becomes heated, and means for conducting vapor to the exterior surface of the cupped member and including a conduit extending to a point adjacent to the burner and adapted to receive thereinto a vapor conducting tube carried by said vessel.

3. In a device of the class described, a body member having gas inlet and outlet ports, a valve between the ports, means including a bi-metallic thermostatic element cooperating with the valve in a manner closing the valve when the element becomes heated, and a relatively thin walled metallic housing supporting the element in direct contact with and along the inner wall thereof and enclosing said means within the body member in a manner preventing the escape of gas therefrom but exposing the thermostatic element to the action of heat applied to the exterior of the housing, the contact of the element with the housing permitting the heat to travel directly by conduction through the latter to the former.

4. In a device of the class described, a body member having gas inlet and outlet ports, a manually operable shut-off valve between the ports, means independent of said valve and including a bi-metallic thermostatic element cooperating with the ports in a manner closing the passage therethrough when the element becomes heated, and means providing a bypass through the body member and around the valve to and between the ports.

5. In a device of the class described, a body member having gas inlet and outlet ports provided through threaded projections on the member, a manually operable valve between the ports, means other than the valve carried by the member and including a bi-metallic thermostatic element cooperating with the ports in a manner closing the passage therethrough when the element becomes heated, a housing for the element carried by the member, a second housing carried by the member and enclosing the first housing, and means for directing heated vapor into the second housing and against the first housing in a manner heating the element.

6. A device for closing an open port into a chamber and automatically controlling a member within the chamber, comprising a relatively thin sheet metal cup-shaped member having a single opening thereinto, a bi-metallic thermostatic element mounted on and directly contacting with and along the inner wall of the cup-shaped member, and means connected to the element and extending outwardly through the opening for controlling the first-named member, the portion of the cup-shaped member about said opening being adapted to fit within and close said port, and the contact of the element with the member permitting heat applied to the exterior of the member to pass directly through the wall thereof and to the element by conduction.

7. The device set forth in claim 6, in which the thermostatic element has a U-shaped end seated within and contacting with diametrically opposite portions of the inner closed side wall of the cup-shaped member and providing a metallic heat-conducting path from the exterior of the cup-shaped member to the element.

8. In a device for automatically controlling the flow of fuel gas to a burner in accordance with the temperature of vapor produced within a portable vessel heated by the burner, a body member having gas inlet and outlet ports, a valve intercepting said ports, means including a bi-metallic thermostatic element cooperating with the valve in a manner closing the valve when the element becomes heated, and means for conducting vapor to the element and including a conduit extending to a point adjacent to the burner and adapted freely to receive thereinto a vapor conducting tube carried by said vessel, the body member having a bypass therethrough to and between the ports whereby to prevent the complete shutting off of gas to the burner and a second bypass therethrough for providing gas to a pilot light adjacent to the burner.

9. The device set forth in claim 3, in which said housing is a sheet metal cup-like member open only at one end and in which said thermostatic element has a U-shaped end seated within the closed end of the cup and in contact with diametrically opposite portions of the side wall thereof.

EUGENE L. BAKER.